(12) United States Patent
Zeng et al.

(10) Patent No.: US 7,710,077 B2
(45) Date of Patent: May 4, 2010

(54) HIGH PERFORMANCE INVERTER CHARGER SYSTEM

(75) Inventors: James Jin Xiong Zeng, Westwood, MA (US); David S. C. Liu, Newton, MA (US)

(73) Assignee: HDM Systems Corp., Allston, MA (US)

( * ) Notice: Subject to any disclaimer, the term of this patent is extended or adjusted under 35 U.S.C. 154(b) by 229 days.

(21) Appl. No.: 11/544,104

(22) Filed: Oct. 6, 2006

(65) Prior Publication Data

US 2007/0081372 A1    Apr. 12, 2007

Related U.S. Application Data

(60) Provisional application No. 60/724,946, filed on Oct. 8, 2005.

(51) Int. Cl.
*H02J 7/00*    (2006.01)

(52) U.S. Cl. .................... 320/136; 320/135; 363/95

(58) Field of Classification Search ............. 320/163, 320/135, 136, 111; 363/132, 95, 109
See application file for complete search history.

(56) References Cited

U.S. PATENT DOCUMENTS

| | | | |
|---|---|---|---|
| 5,170,336 A * | 12/1992 | Getter et al. ............ | 363/141 |
| 6,927,607 B2 | 8/2005 | Choi et al. | |
| 7,208,916 B1 * | 4/2007 | Boatwright et al. ....... | 320/150 |
| 2004/0027001 A1 * | 2/2004 | Reed, III ................. | 307/10.1 |
| 2004/0164683 A1 * | 8/2004 | Bettis ..................... | 315/169.3 |
| 2004/0196669 A1 | 10/2004 | Thrap | |
| 2005/0134230 A1 | 6/2005 | Sato et al. | |

OTHER PUBLICATIONS

PCT/US 06/39930, Notification of Transmittal of the International Search Report and the Written Opnion of the International Searching Authority, or the Declaration, 5pgs., Nov. 19, 2007.
PCT/US 06/39930, Written Opinion of the International Searching Authority, 5pgs, Nov. 19, 2007.

* cited by examiner

*Primary Examiner*—Edward Tso
*Assistant Examiner*—Aaron Piggush
(74) *Attorney, Agent, or Firm*—Blakely Sokoloff Taylor & Zafman LLP

(57) ABSTRACT

Techniques for high performance inverter charger systems are described herein. In one embodiment, a power supply system includes, but is not limited to, an inverter to generate an AC (alternating current) output based on a DC (direct current) input, a current sensing circuit coupled to the inverter to sense an amount of current drawn from the inverter, and a microcontroller coupled to the inverter and the current sensing circuit to reduce the AC output of the inverter according to a predetermined algorithm stored within the microcontroller, in response to a detection that the amount of current drops below a predetermined threshold. Other methods and apparatuses are also described.

14 Claims, 13 Drawing Sheets

Conventional Top Surface Layout

- higher temperature rise on individual components
- lower efficiency and shorter product life Distributed Power Architecture

- lower temperature rise on individual components
- improves efficiency and extends product life

| On/Off Switch | SHORE POWER | INVERTER | CHARGER | INV/CHR | SP | |
|---|---|---|---|---|---|---|
| ON | OFF | ON | OFF | ● | ○ | Solid Green / "Blank" |

| On/Off Switch | SHORE POWER | INVERTER | CHARGER | INV/CHR | SP | |
|---|---|---|---|---|---|---|
| ON | OFF | Sleeping Mode | OFF | ☀ (blinking) | ○ | Blinking Green (0.5sec ON; 4.5sec OFF) / "Blank" |

| On/Off Switch | SHORE POWER | INVERTER | CHARGER | INV/CHR | SP | |
|---|---|---|---|---|---|---|
| ON | OFF | Input OVP | OFF | ☀ (blinking) | ○ | Blinking Green (0.5sec ON; 0.5sec OFF) / "Blank" |

| On/Off Switch | SHORE POWER | INVERTER | CHARGER | INV/CHR | SP | |
|---|---|---|---|---|---|---|
| ON | OFF | Overload; SCP; OVP | OFF | ● | ○ | Solid Orange / "Blank" |

| On/Off Switch | SHORE POWER | INVERTER | CHARGER | INV/CHR | SP | |
|---|---|---|---|---|---|---|
| ON | OFF | Over Temp | OFF | ○ | ○ | "Blank" / "Blank" |

| On/Off Switch | BATTERY | INV/CHR | SP | |
|---|---|---|---|---|
| ON | DISCONNECT | ○ | ○ | "Blank" / "Blank" |

| On/Off Switch | | INV/CHR | SP | |
|---|---|---|---|---|
| OFF | | ○ | ○ | "Blank" / "Blank" |

Figure 12A

| On/Off Switch | SHORE POWER | INVERTER | CHARGER | INV/CHR | SP | |
|---|---|---|---|---|---|---|
| ON | ON | OFF | ON | ● | ● | Solid Red / Solid Green |

| On/Off Switch | SHORE POWER | INVERTER | CHARGER | INV/CHR | SP | |
|---|---|---|---|---|---|---|
| ON | ON | OFF | Low Voltage Charging | ☀ (blinking) | ● | Blinking Orange/Red (1sec ORANGE; 1sec RED) / Solid Green |

| On/Off Switch | SHORE POWER | INVERTER | CHARGER | INV/CHR | SP | |
|---|---|---|---|---|---|---|
| ON | ON | OFF | Low Voltage Timed Charge | ☀ (blinking) | ● | Blinking Orange/Red (0.5sec ORANGE; 0.5sec RED) / Solid Green |

| On/Off Switch | BATTERY | INV/CHR | SP | |
|---|---|---|---|---|
| ON | DISCONNECT | ○ | ○ | "Blank" / "Blank" |

| On/Off Switch | | INV/CHR | SP | |
|---|---|---|---|---|
| OFF | | ○ | ○ | "Blank" / "Blank" |

Figure 12B

HIGH PERFORMANCE INVERTER CHARGER SYSTEM

RELATED APPLICATIONS

This application claims the benefit of U.S. Provisional Patent Application No. 60/724,946, filed Oct. 8, 2005, entitled "High Performance Inverter Charger System Design", the disclosure of which is incorporated by reference herein in its entirety.

FIELD OF THE INVENTION

The present invention relates generally to battery charging systems. More particularly, this invention relates to inverter charging systems.

BACKGROUND

Mobile applications, such as marine and vehicle, require watertight power devices for use outdoors. However, power devices over 1 KW generate a significant amount of heat from their electrical components, and heat dissipation is made more difficult by the watertight properties. Heat sinks, which are typically effective for thermal management, are not enough to dissipate the amount of heat contained within a watertight package. If the power device cannot sufficiently dissipate the heat, the electrical components will fail due to thermal stress. The design goal here is to provide a watertight Inverter Charger Combination System, which provides up to 2.5 KW of power, with a useful operational temperature range (e.g., −40° C. to +50° C.) through efficient thermal management.

SUMMARY OF THE DESCRIPTION

Techniques for high performance inverter charger systems are described herein. In one aspect of the invention, a power supply system includes, but is not limited to, an inverter to generate an AC (alternating current) output based on a DC (direct current) input, a current sensing circuit coupled to the inverter to sense an amount of current drawn from the inverter, and a microcontroller coupled to the inverter and the current sensing circuit to reduce the AC output of the inverter according to a predetermined algorithm stored within the microcontroller, in response to a detection that the amount of current drops below a predetermined threshold.

According to another aspect of the invention, an inverter charger system includes, but is not limited to, an inverter to generate an AC (alternating current) output based on a DC (direct current) input, a casing for housing the inverter, the casing having a top surface, a bottom surface, and a side surface, one or more heat sinks mounted on an exterior side of the side surface, wherein one or more power components of the inverter are mounted on an interior side of the side surface to allow heat generated by the one or more power components to be dissipated via the one or more heat sinks, and a cooling fan mounted on the top surface of the casing for generating forced air blowing from the top surface to the bottom surface of the casing and passing through fins of the one or more heat sinks mounted on the side surface.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 12A and 12B are diagrams illustrating status indicating panels of an inverter charger system according to certain embodiments of the invention.

DETAILED DESCRIPTION

Techniques for high performance inverter charger systems are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Watertight Exterior

Figure 1:
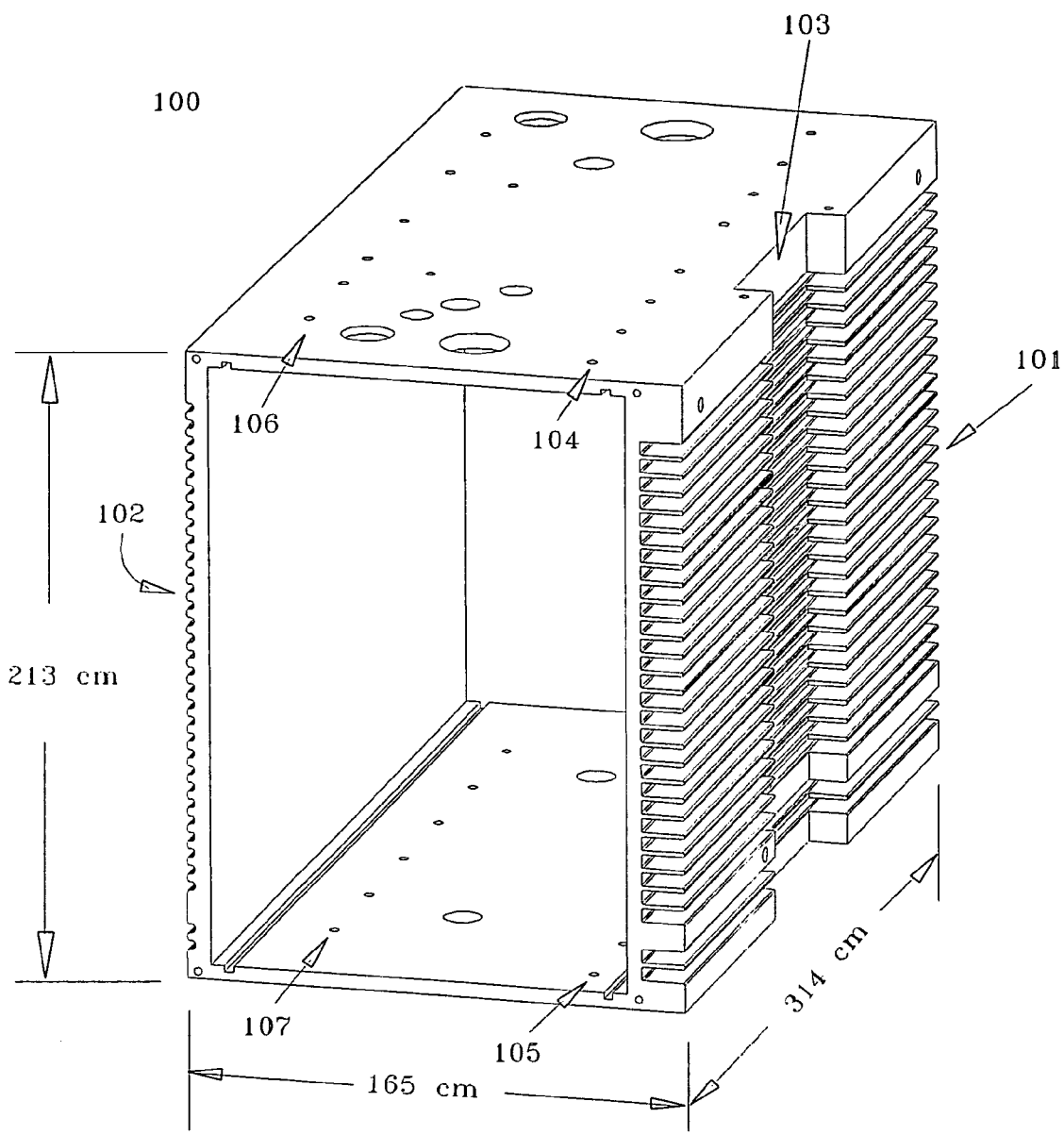
FIGS. 1-3 are diagrams illustrating certain packaging configurations of an inverter charger system according to certain embodiments of the invention.
Figure 2:
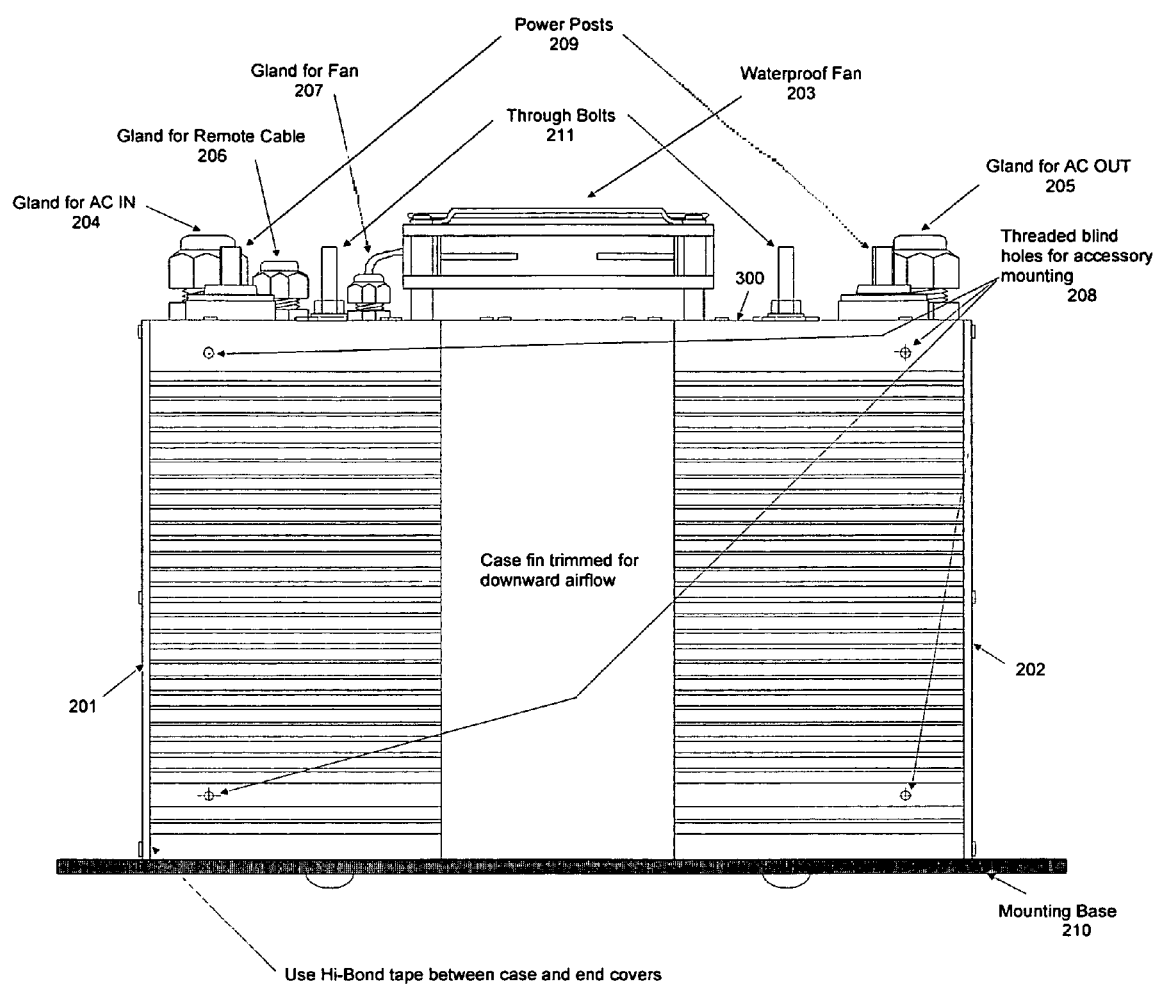
Figure 3:
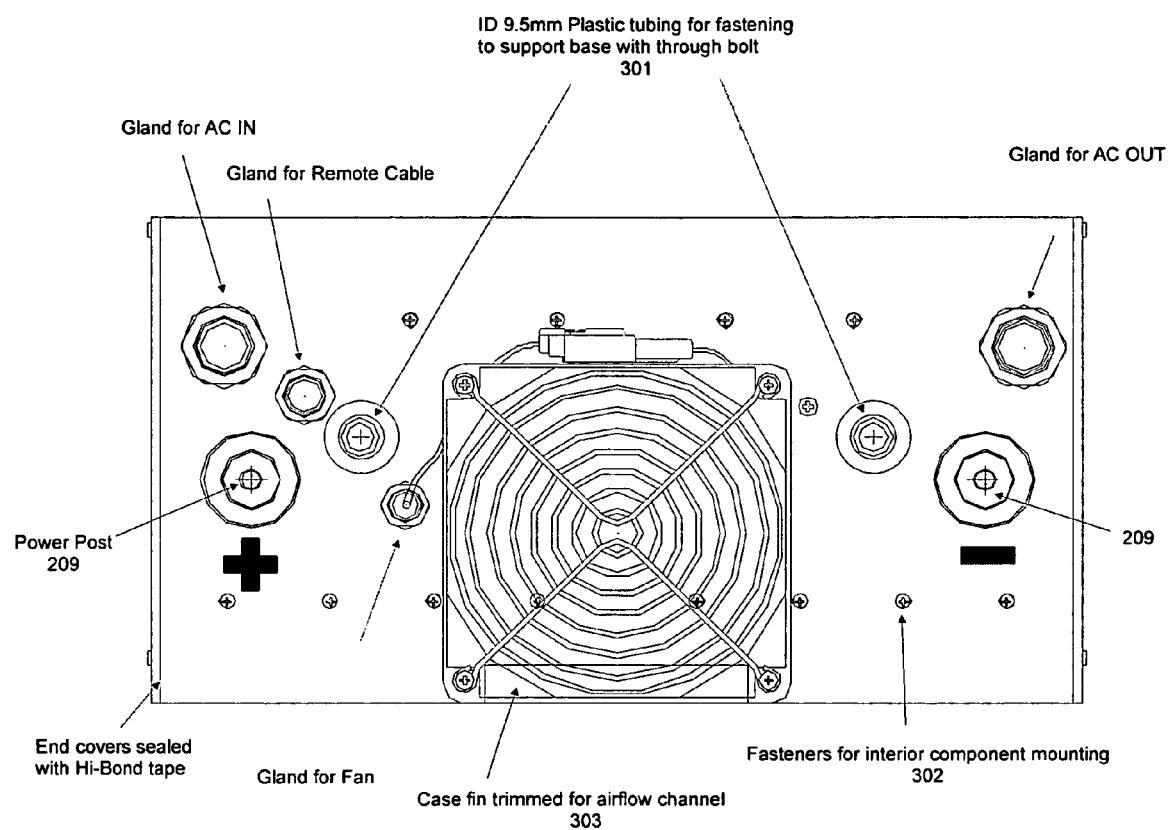

FIGS. 1-3 are block diagrams illustrating a perspective view, front view, and a top view of an enclosure for housing an inverter according to one embodiment of the invention. In one embodiment, an exemplary system includes, but is not limited to, an inverter to generate an AC (alternating current) output based on a DC (direct current) input, a casing for housing the inverter, the casing having a top surface, a bottom surface, and a side surface, one or more heat sinks mounted on an exterior side of the side surface, wherein one or more power components of the inverter are mounted on an interior side of the side surface to allow heat generated by the one or more power components to be dissipated via the one or more heat sinks, and a cooling fan mounted on the top surface of the casing for generating forced air blowing from the top surface to the bottom surface of the casing and passing through fins of the one or more heat sinks mounted on the side surface.

Referring to FIGS. 1-3, according to one embodiment, case exterior 100 is made of extruded aluminum (or alloy) tube, which may include heat sink fins 101-102, and two plates 201-202 at either end. The cover plates 201-202 may be fastened to the tube 100 with screws and/or sealed with a high bond tape at the extrusion tube ends. Alternatively, copper, silver, brass and other zinc alloys may also be used.

In one embodiment, a waterproof fan 203 is mounted on an exterior surface 300 for cooling purposes. In one embodiment, three glands 204, 205, 206 may be used for the AC (alternating current) power input, AC power output, and remote control cables, respectively, to ensure that the openings for these cables are waterproof. Alternatively, one gland may be used for all three cables together. An additional gland (207) may be used to waterproof the case openings for the fan cable.

Furthermore, according to certain embodiments of the invention, there may be additional threaded blind holes 208 on one or more case surfaces (e.g., 101, 102) for mounting accessories, such as a DC/DC converter, voltage regulator, circuit breakers, input filters, output filters, external EMI filters, fuse boxes, and/or other control board protection devices. In one embodiment, four rows of small case holes (104-107) are used for mounting power components, such as diodes and/or MOSFETs on the PCBs (printed circuit boards) to an inside surface of the case. Nylon washers and countersinks at the case holes may be used to produce a watertight seal when screws are applied to the majority of these aforementioned holes (104-107).

Further, according to certain embodiments of the invention, there may be additional power posts 209 for a connection of an inverter charger to the positive and negative posts of a battery. Further, there may be one or more plastic tubes 301 for fastening the case to support base 210 with through bolts 211. Through bolt set dimensions are as follows: approximately ¼"-20 bolts 10" in length, approximately ¼" flat washers, approximately ¼" lock washers, approximately ¼" hex nut.

Figure 4:
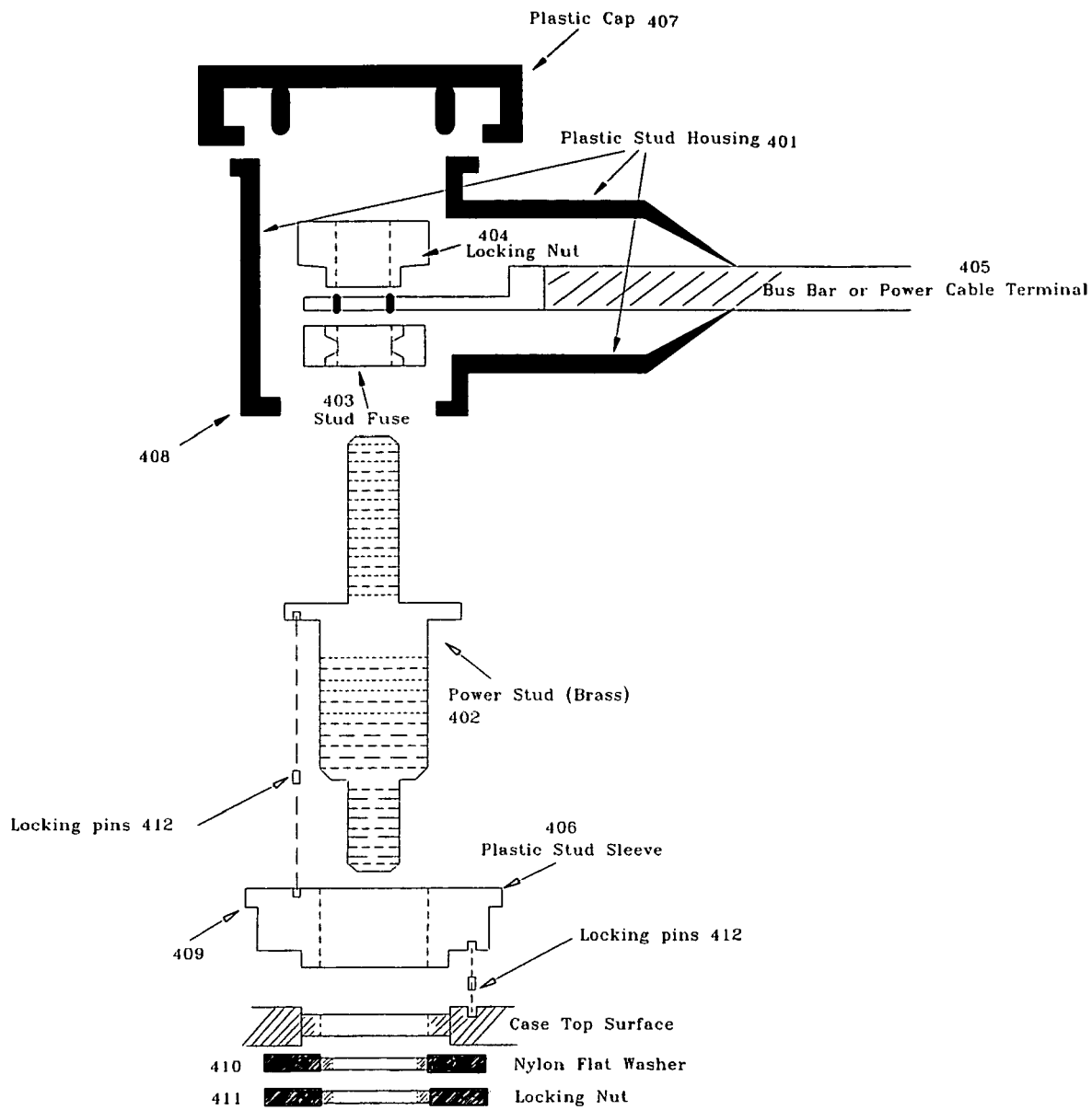
FIG. 4 is a block diagram illustrating an exemplary fastening mechanism for an inverter charger system.

According to certain embodiments of the invention, the positive and negative power posts (209) on the inverter charger provide the electrical connections to the battery positive and negative poles allowing the inverter to convert DC from a battery to AC power. The power post connections also allow the charger to charge the battery. For example, structures as shown in FIG. 4 may be used as a part of a power post assembly. Referring to FIG. 4, according to one embodiment, plastic housing 401 is used to cover the power stud 402, stud fuse 403, the locking nut 404, and/or the power cable terminal 405. A lip 408 on the inside of the plastic housing catches on the rim 409 of the nylon stud sleeve 406 to ensure a watertight seal for these electrical connections as well as the optional stud fuse 403. A plastic cap 407 provides watertight property while maintaining easy access to the parts attached to the power post. The nylon stud sleeve 406 and nylon washer 410 provide insulation for the power posts from the case. Locking pins (412) may be used to prevent the rotation of the post when the bus bar or power cable terminal (405) is fastened to the power stud. The power stud 402 is fastened to the case with locking nut 411 and sealed with epoxy adhesive to waterproof the opening.

FIG. 2 shows that, in one embodiment, through bolts 211 are used for tightening an inverter charger to a support base plate or frame 210. These through bolts 211 are guided through the body of the inverter charger from the top to bottom surface openings with plastic tubes to ensure a watertight seal and to prevent the through bolts from contacting any electrical components described above.

Thermal Management: Airflow Cooling Provided by Exterior Waterproof Fan(s)

As shown in FIG. 1, according to one embodiment, heat sink fins 101-102 cover as much of the case exterior as possible to provide more surface area for heat dissipation. Waterproof fan(s) are mounted on the case exterior surface for cooling purposes. In one embodiment, high temperature components are mounted to the interior of the case surface 302, directly opposite the waterproof fan(s) to optimize temperature control.

In one embodiment, exterior mounted fan(s) are also positioned over a channel 103 (or 303), cut approximately 3.5" wide×0.6" deep into the exterior of the case to direct airflow from the heat sink fins downward, providing simultaneous airflow to multiple surfaces of the case (e.g. the top surface and up to 3 adjacent surfaces, depending on the size and placement of the fan).

Thermal Management: Distributed Power Architecture Approach

Figure 5A:
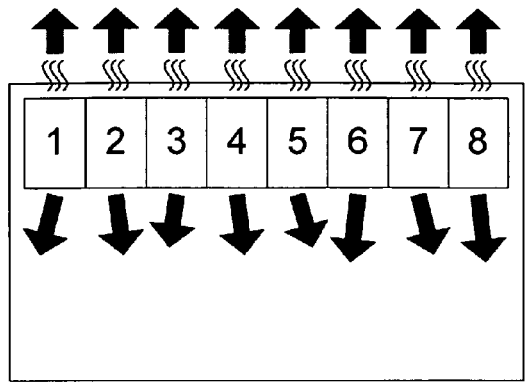
FIG. 5A is a diagram illustrating a conventional power component distribution configuration.
Figure 5B:
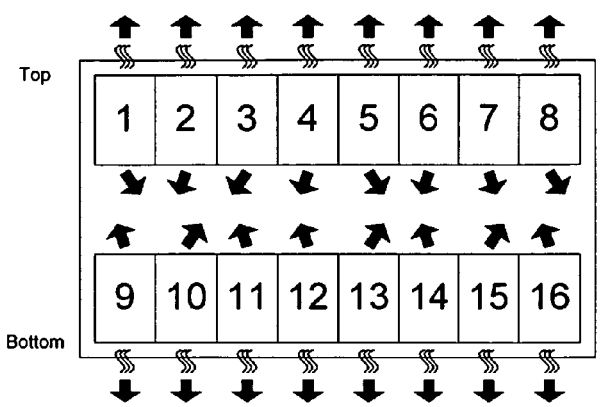
FIG. 5B is a diagram illustrating a power component distribution configuration according to one embodiment of the invention.

According to certain embodiments of the invention, multiple power MOSFETs and transformers may be used to increase system power surge capabilities, to maintain high operating output power, and/or to operate at higher temperatures. A sufficient number of power MOSFETs and transformer sets (1-16) are used in parallel in the distributed power architecture (see FIG. 5B) so that the power dissipation imposed on each set is lower than that which is imposed in a conventional power architecture using fewer sets of MOSFETs and transformers (see FIG. 5A) and reduces hotspots during the high temperature operation of the device. The efficiency of the power conversion will generally increase as a result of the lower temperature rise of each individual power component.

Figure 6:
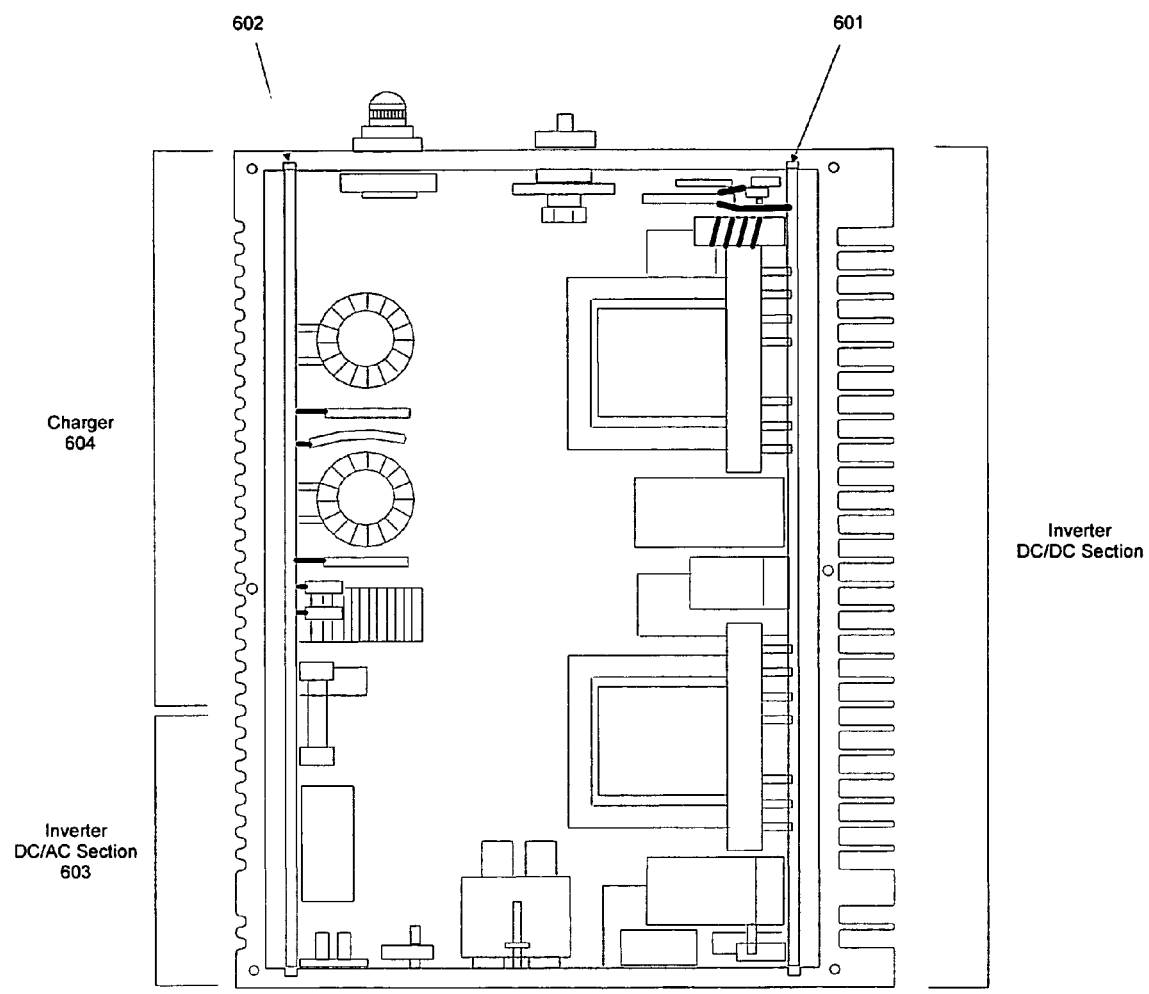
FIG. 6 is a diagram illustrating an exemplary component layout configuration of an inverter charger according to one embodiment.

In order to most effectively dissipate heat generated by the MOSFETs and transformers used to convert DC to AC, these components are placed across two PCBs (601, 602) that face each other when installed in the case (see FIG. 6). The inverter DC/DC section is located on one PCB (601), while the charger (604) and inverter DC/AC section (603) are located on the other PCB (602), such that if the charger section were omitted, the two sections of the inverter would still lie across two PCBs. The dual-PCB configuration allows the power MOSFETs and diodes to be distributed across the top and bottom case surfaces to achieve maximum heat dissipation by using as much case surface area as possible. The overall package size can be reduced and power density increased due to the two-PCB configuration.

Heat dissipation of other key components, such as transformers, inductors and inrush current limiters, is achieved through the use of room-temperature-vulcanized (RTV) potting. Partial potting of two sides of the case interior allows the heat transfer for these components on the PCBs that are not directly fastened to the inside of the case surface. The potting material provides contact between the components, the PCB and the inside of the case surface.

Inverter Sleeping Mode

Figure 7:
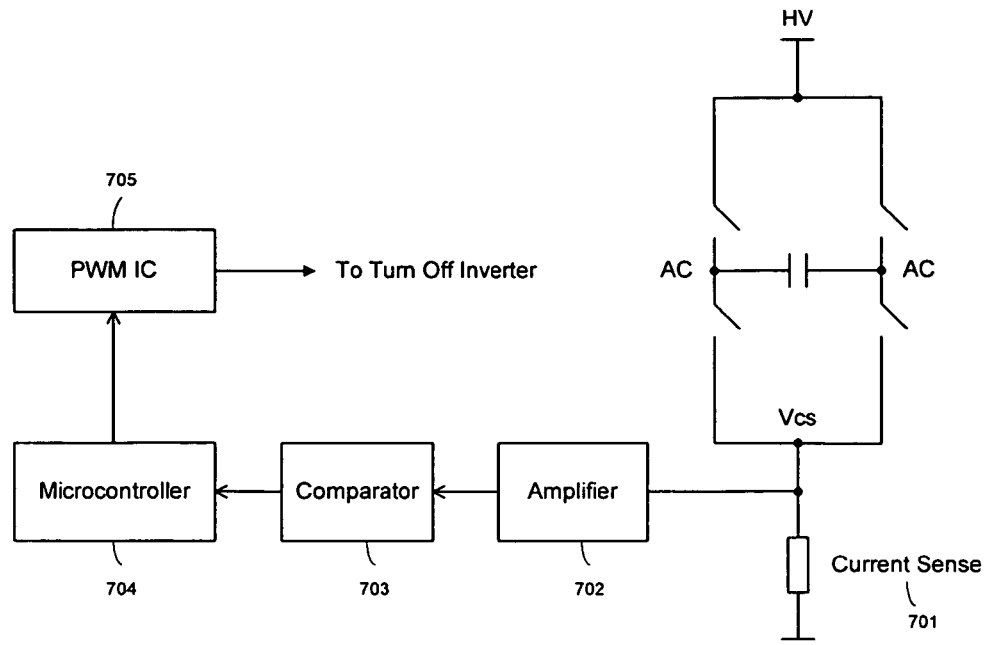
FIG. 7 is a schematic diagram illustrating an inverter charger system according to one embodiment of the invention.

FIG. 7 is a block diagram illustrating an exemplary inverter charger system according to one embodiment. For example, system 700 may be implemented as part of configurations described above with respect to FIGS. 1-6. In one embodiment, an exemplary system includes, but is not limited to, an inverter to generate an AC (alternating current) output based on a DC (direct current) input, a current sensing circuit coupled to the inverter to sense an amount of current drawn from the inverter, and a microcontroller coupled to the inverter and the current sensing circuit to reduce the AC output of the inverter according to a predetermined algorithm stored within the microcontroller, in response to a detection that the amount of current drops below a predetermined threshold.

Alternatively, an exemplary system includes, but is not limited to, an inverter to generate an AC (alternating current) output based on a DC (direct current) input, and a microcontroller coupled to the inverter to adjust the AC output of the inverter according to a predetermined algorithm stored within the microcontroller, when the AC output of the inverter satisfies a predetermined condition for a predetermined period of time, wherein at least one of the predetermined algorithm, the predetermined condition, and the predetermined period of time are user programmable within the microcontroller.

Referring to FIG. 7, in order to conserve energy in battery cells, according to one embodiment, the inverter automatically shifts into the sleeping mode when output AC current is less than a predetermined threshold (e.g., 0.3 $A_{AC}$) for a predetermined threshold (e.g., one hour), in one particular embodiment, unit will go into a sleeping mode. The set point for output AC current and the sleeping mode timer is programmable. A self-monitor control system, which may include microcontroller 704, Comparator 703, Amplifier 702, and/or Current Sense 701, within the inverter, which retrieves current sense voltage information provided by current sensor 701, feeds via amplifier 702 this information back to the microcontroller 704 and shuts down the power inverter via PWM (pulse width modulator) 705 when the output load falls below a predetermined threshold (e.g., a minimum-loading limit within a predetermined time) via comparator 703. Note that current sense circuit 701 can use a resistor or a transformer.

In one embodiment, referring to FIG. 7, when current sense device 701 senses an amount of current drawn from the inverter, it generates a sense voltage representing the current. Although this sense voltage may be relatively small, amplifier 702 may be optionally used to amplify the sense voltage. The amplifier 702 may have a gain ranging from ×10 to ×100. Comparator 703 is configured to compare an output of the amplifier 702 or the direct sense voltage from the sensing device 701 with respect to a predetermined threshold. A result of the comparison is fed into microcontroller 704, which may be a FPGA (field programmable gate array). The microcontroller 704 may include a storage medium therein to store instructions representing a predetermined algorithm which is used to generate a control signal to PWM 705 in order to control the inverter. In a particular embodiment, microcontroller 704 generates a signal after a predetermined delay in response to the output of the comparator, where the predetermined delay may be programmable within the microcontroller 704.

Figure 8:
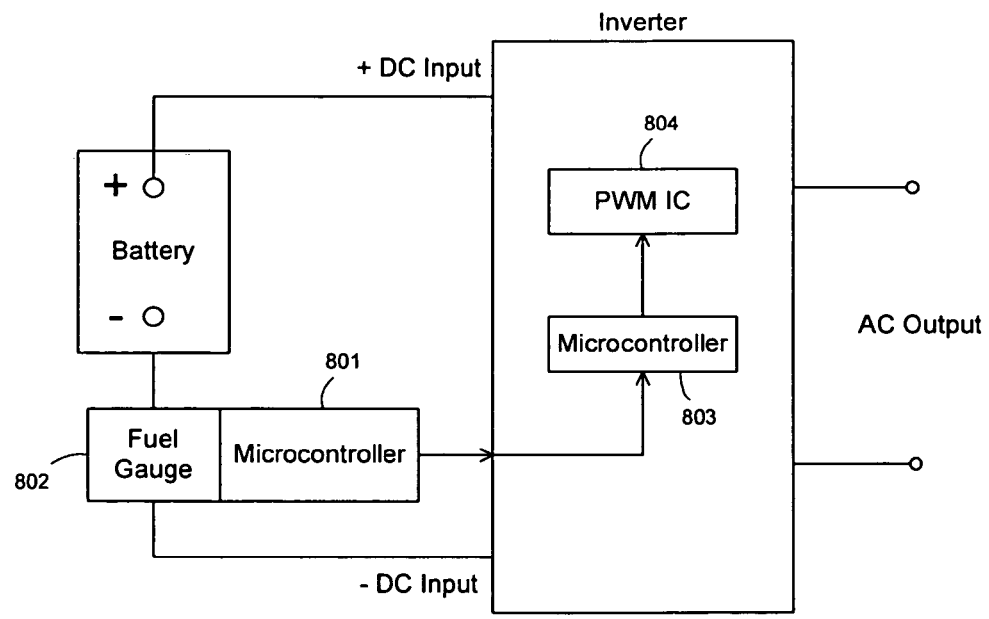
FIG. 8 is a schematic diagram illustrating an inverter charger system according to another embodiment of the invention.

FIG. 8 is a block diagram illustrating an exemplary inverter charger system according to an alternative embodiment. For example, system 800 may be implemented as part of configurations described above with respect to FIGS. 1-6. In one embodiment, an exemplary system includes, but is not limited to, an inverter to generate an AC (alternating current) output based on a DC (direct current) input, a battery coupled to provide the DC input to the inverter, and a microcontroller coupled to the inverter and the battery to control operations of the inverter based on one or more operating conditions of the battery according to a predetermined user programmable algorithm stored within the microcontroller.

Referring to FIG. 8, according to one embodiment, a fuel gauge 802 may be used in conjunction with an inverter to put the inverter into sleep mode automatically. In one embodiment when output AC current is less than a predetermined threshold such as the 0.3 $A_{AC}$ for a predetermined period of time such as one hour, the unit will go into sleeping mode. Set point for output AC current and the sleeping mode timer is programmable. Using an embedded microcontroller 801 from fuel gauge monitor 802, an internal timer (not shown) is triggered when a minimum current flow or no voltage drop is detected. Once the predetermined period of time is reached and there is minimal or no load activity, the microcontroller 801 turns off the power inverter (e.g., via microcontroller 803 and PWM 804). Quiescent power consumption due to no load activity is thus reduced for the battery cell.

In one embodiment, fuel gauge 802 may include another microcontroller 801 therein to determine or identify characteristics of the battery and/or the current conditions of the battery (e.g., output voltage or current, and/or remaining power available). The microcontroller 801 may perform such a determination based on a predetermined algorithm programmed and stored therein. Further detailed information concerning the algorithm of fuel gauge microcontroller 802 can be found in a co-pending U.S. patent application Ser. No. 11/226,651, entitled "Methods and Apparatuses for Determining Battery Capacity", filed Sep. 13, 2005, which is incorporated by reference herein in its entirety.

Automatic Inverter Restart

Figure 9:
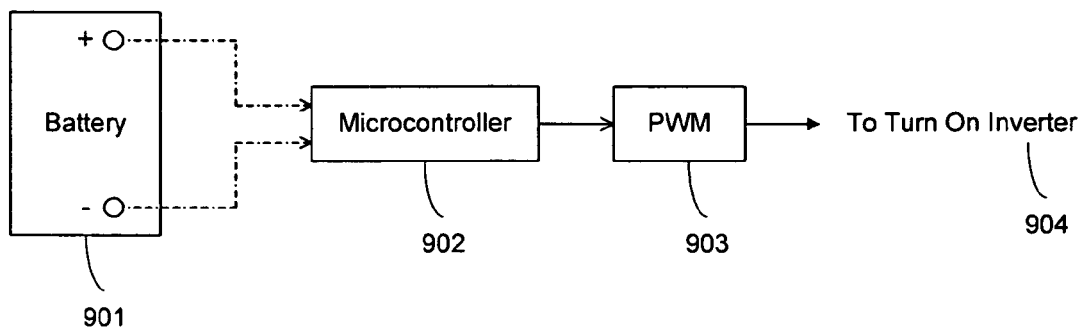
FIG. 9 is a schematic diagram illustrating an inverter charger system according to another embodiment of the invention.

After an inverter has been put into a sleep mode, the inverter may be restart or waken up from the sleep mode. FIG. 9 is a block diagram illustrating an exemplary circuit to restart an inverter from a sleep mode according to one embodiment. Referring to FIG. 9, according to one embodiment, a restart circuit automatically turns on the inverter 904 from a sleeping mode when a battery voltage change is detected at a battery 901. In response to the battery voltage change, a microcontroller 902 triggers the PWM (pulse width modulator) 903 to power up the inverter 904 when battery voltage exceeds a preset value indicating that the battery voltage is being charged by an external source (e.g. alternator of a vehicle) or an increase of battery voltage from a set of consecutive measurements indicating battery is subjected to charging. The automatic inverter restart circuit may greatly reduce the need for the manual cycling of the control on/off switch for inverter reset/power up during normal operating conditions.

Power Limit Automatic Change

Figure 10:
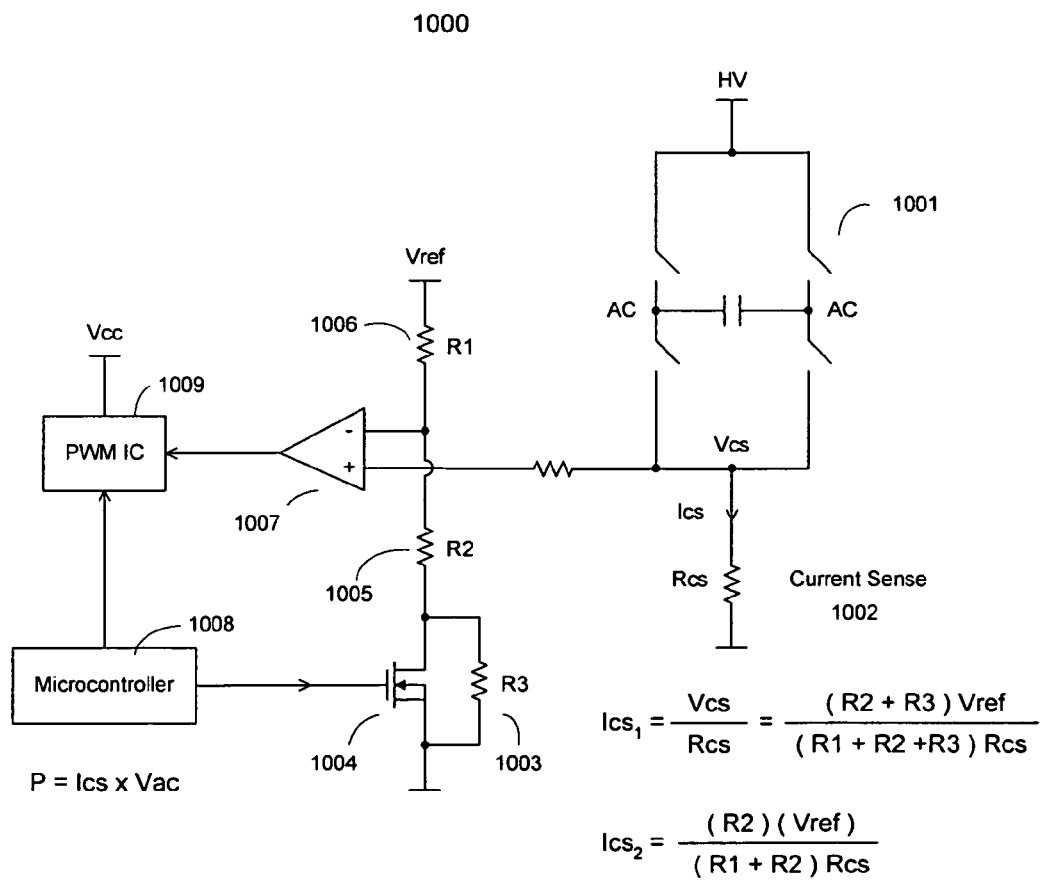
FIG. 10 is a schematic diagram illustrating an inverter charger system according to another embodiment of the invention.

FIG. 10 is a schematic diagram illustrating an exemplary inverter charger system according to one embodiment of the invention. For example, exemplary system 1000 may be implemented as part of systems 700 of FIG. 7 and/or system 800 of FIG. 8. Referring to FIG. 10, an automatic power limit control circuit changes the current limit threshold point after a preset time is reached in an electrical inverter system. A microcontroller with an internal timer is used to alter the current limit threshold point during a given time for electrical power surge applications. Once the preset time is reached, the power limit of the electrical inverter system will be automatically reduced to its rated power. This automatic control circuit will allow high surge capabilities during initial application startup and prevents the power inverter system from premature overheating.

According to certain embodiments of the invention, AC output is generated from the DC/AC full bridge circuit 1001. For a current sense circuit, current sense resistor 1002 is used to detect loading conditions. Resistor 1003 is a current limiting resistor for the initial higher current (high surge capability) limiting set point. Switch 1004 is activated by the microcontroller 1008 for the power limit automatic change circuit. Resistor 1006 and resistor 1005 are current limiting set point divider resistors. Amplifier 1007 determines the current limit threshold by a preset reference point. PWM 1009 detects the signal from the amplifier 1007 and shuts down the inverter. Microcontroller 1008 has a timer having a predetermined expiration time such as one minute. During an initial power up, the inverter has a surge capability of approximately 6000 W according to a particular embodiment. After the predetermined period of time (e.g., 1 minute), the microcontroller 1008 sends a signal to the switch 1004 which will automatically reduce the power rating (e.g., with a normal current limit threshold). Note that the timer information may be programmable according to a predetermined algorithm stored within the microcontroller 1008.

In this example, referring back to FIG. 10, during an initial period of time, which is controlled by a predetermined algorithm of microcontroller 1008, the microcontroller 1008 turns off a switching device 1004, in this example, a MOSFET. As a result, the reference voltage provided to amplifier 1007 is determined by resisters 1003, 1005, and 1006, which constitute a relatively high reference signal that in turn causes higher current limit threshold. After the initial period of time, the microcontroller 1008 turns on the switching device 1004, which substantially shorts out the resister 1003. As a result, the reference voltage of the amplifier 1007 is lower, which in turn lowers the currently limit threshold.

Automatic Mode Selection

Figure 11:
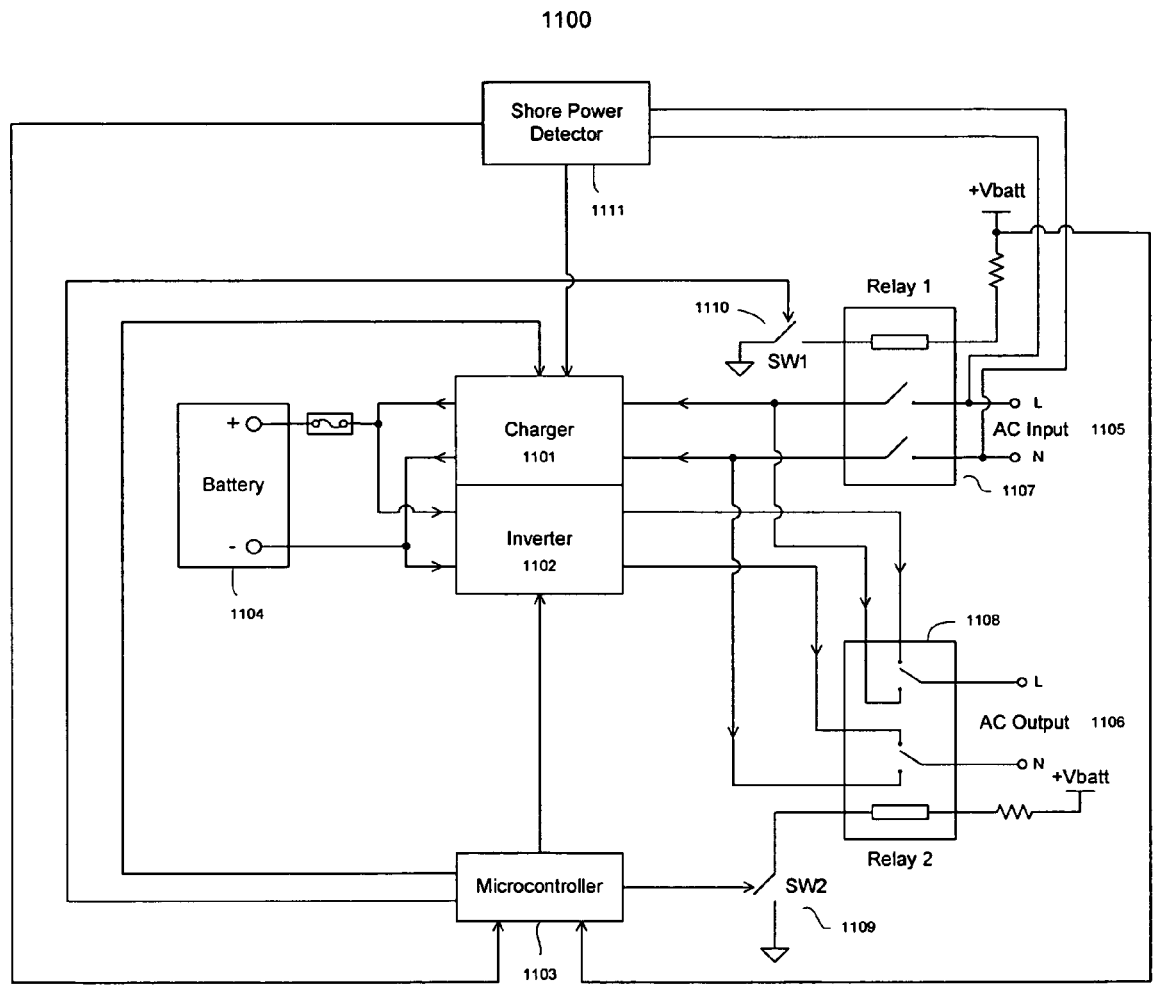
FIG. 11 is a schematic diagram illustrating an inverter charger system according to another embodiment of the invention.

FIG. 11 is a schematic diagram illustrating an exemplary circuit for operating an inverter charger system according to one embodiment of the invention. In one embodiment, an automatic mode selection circuit a shore power detector 1111 to detect the input source (e.g., whether an AC power source is available), selects a system mode including an inverter or charger mode, and controls an output through a set of system relays. In this embodiment, a microcontroller is used to control the operating mode of the inverter charger system 1100.

Referring to FIG. 11, when no AC input source (e.g., AC input 1105) is detected, the microcontroller 1103 is configured to set the system 1100 into an inverter mode where an AC output 1106 is generated based on a DC input, for example, provided by battery 1104. Once an AC source 1105 or shore power (e.g., alternative power, auxiliary power or utility power) is detected, the microcontroller 1103 may disable the inverter 1102 and switch the system 1100 to a charger mode, and/or activate the relays 1107-1108 for a shore power bypass to the output 1106. During the charger mode, shore power is used to charge battery 1104. Meanwhile, the shore power or AC input power is provided to AC output 1106, bypassing the charger 1101 and inverter 1102.

This automatic mode selection circuit may reduce simultaneous AC voltage and shore power generation at the output 1106 and eliminate inverter/charger system failures. In one embodiment, shore power detector 1111 detects AC voltage at the AC input 1105, sends a signal to microcontroller 1103 to turn off SW2 1109 which deactivate Relay2 1108, and turns off the inverter. After a predetermined delay (e.g., few seconds), microcontroller 1103 turns on switch 1110 which activates relay 1107 where the AC voltage will bypass to AC output 1106 and turns on the internal charger 1101 to charge the battery 1104. When AC voltage is removed from the AC input 1105, microcontroller 1103 turns off switch 1110 which deactivates relay 1107 and turns off internal charge 1101. After a predetermined (e.g., few seconds time) delay, microcontroller 1103 turns on switch 1109 which activates relay 1108 and turns on the inverter 1102. All timers are programmable within microcontroller 1103.

Battery Disconnect Protection

Referring back to FIG. 11, a battery disconnection protection circuit including relay 1107, relay 1108, and microcontroller 1103, monitors a battery voltage, detects open-circuit battery connections, and disables the system output by deactivating the system relays. In one embodiment, microcontroller 1103 is used to control the system relays for various output modes such as AC voltage, shore power, and/or off condition. When the battery is disconnected from the system, the microcontroller 1103 momentarily deactivates the system relays and turns off the output to reduce any residual AC energy at the output. According to certain embodiments of the invention, when unit is disconnected during Inverter mode, relay 1108 is deactivated and microcontroller 1103 turns off the inverter. When unit is disconnected during charge mode, relay 1107 is deactivated and microcontroller 1103 turns off the internal charger 1101.

Status Indicators

Figure 13:
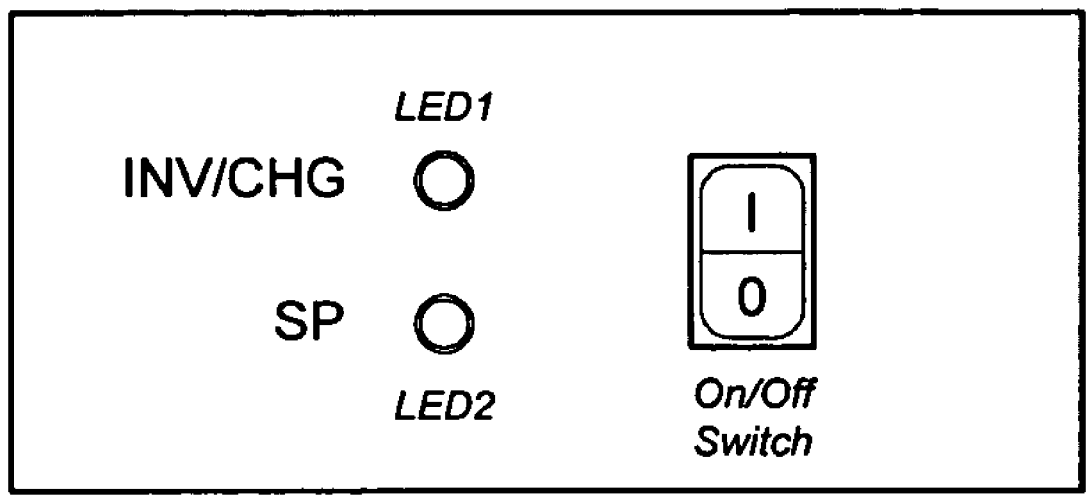
FIG. 13 is a remote panel of an inverter charger system according to one embodiment of the invention.

FIGS. 12A and 12B are block diagrams illustrating an exemplary interface for indicating statuses of an inverter charger system according to one embodiment. In one embodiment, LED status indicators are located at the remote panel (as shown in FIG. 13). Referring to FIGS. 12A and 12B, LED status indicators for the Inverter Charger combination system are as follows:

INV/CHG LED=Inverter Charger LED

SP LED=Shore Power LED

In one embodiment, during inverter mode, a control switch is ON; shore power is OFF; inverter is ON; charger is OFF. As a result, the status indicators may look like the following:

INV/CHG LED is green

SP LED is blank

In one embodiment, during a sleeping mode, a control switch is ON; shore power is OFF; inverter is in sleeping mode; charger is OFF. As a result, the status indicators may look like the following:

INV/CHG LED is slow blinking green

SP LED is blank

In one embodiment, during an input over-voltage protection, a control switch is ON; shore power is OFF; inverter is in input over-voltage protection; charger is OFF. As a result, the status indicators may look like the following:

INV/CHG LED is fast blinking green

SP LED is blank

In one embodiment, during an output overload, output short circuit protection or output over-voltage protection, a control switch is ON; shore power is OFF; inverter is in overloading, short circuit or over-voltage; charger is OFF. As a result, the status indicators may look like the following:

INV/CHG LED is orange
SP LED is blank

In one embodiment, during an over temperature protection, a control switch is ON; shore power is OFF; inverter is in over temperature protection; charger is OFF. As a result, the status indicators may look like the following:

INV/CHG LED is blank
SP LED is blank

In one embodiment, during a battery disconnect, a control switch is ON; shore power is OFF; inverter is in battery disconnect mode; charger is OFF. As a result, the status indicators may look like the following:

INV/CHG LED is blank
SP LED is blank

In one embodiment, during a charger mode, a control switch is ON; shore power is ON; inverter is OFF; charger is ON. As a result, the status indicators may look like the following:

INV/CHG LED is red
SP LED is green

In one embodiment, during a low voltage charge mode, a control switch is ON; shore power is ON; inverter is OFF; charger is in low voltage charge mode. As a result, the status indicators may look like the following:

INV/CHG LED is slow blinking orange/red
SP LED is green

In one embodiment, during a low voltage timed charge mode, a control switch is ON; shore power is ON; inverter is OFF; charger is in low voltage time charge mode. As a result, the status indicators may look like the following:

INV/CHG LED is fast blinking orange/red
SP LED is green

In one embodiment, when the system is off, control switch is OFF or battery is disconnected from inverter/charger combination system. As a result, the status indicators may look like the following:

INV/CHG LED is blank
SP LED is blank

Packaging

The inverter charger was designed to produce the maximum power possible within the size and shape equivalent of a Group 31 compatible battery (e.g., approximately 12.5"×8.5"×6.5"). The inverter charger is intended for installation adjacent to the batteries and is connected to the battery posts with a bus bar or power cable (see, e.g., FIGS. 2-3). The inverter charger's two power posts are substantially identical in distance from each other (e.g., approximately 10") and in height (e.g., approximately 9") to the battery's power posts. In a preferred embodiment, the distance between the inverter charger power posts and battery power posts is approximately 7"-7.5". The placement of the inverter charger power posts and the configuration of the system allow for a minimal cable length to be used. Ultimately the short cable length maximizes the efficiency of the current carried across the cable from the battery or battery bank, which can reach up to approximately 200 Amperes.

In one embodiment, the mounting multiple power components such as MOSFETs, diodes, and rectifiers, on the case or heat sink surface in power product assembly with screws and nuts requires strong fastening for effective heat transfer. In a watertight enclosed package consisting of extruded tubing (e.g., 4 sides) and cover end plates (e.g., 2 sides), the fastening of multiple power components inside the case is often along the longitudinal plane of the tube in order to transfer heat sufficiently. However, this power component positioning is problematic, due to lack of access from within the power supply needed to fasten the high temperature components to the case.

Figure 14:
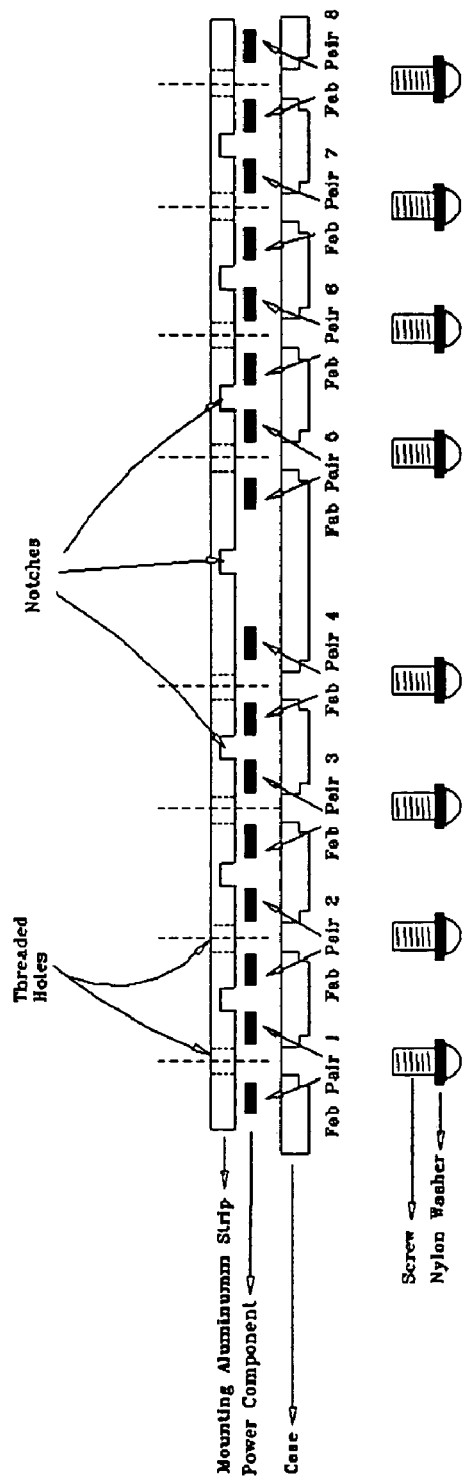
FIG. 14 is a diagram illustrating a fastening mechanism for mounting power components of an inverter charger system according to one embodiment of the invention.

Instead, according to one embodiment, an aluminum strip with multiple threaded holes that align with holes on the case is used. FIG. 14 is a block diagram illustrating an exemplary packaging configuration according to one embodiment of the invention. Referring to FIG. 14, according to certain embodiments of the invention, notches are cut into the aluminum strip, between each power component pair, to provide strip flexibility when normal variations in component thickness occur. As components of different thickness are fastened to the case, the strip needs to be slightly pliable in order to exert even pressure necessary to maintain full contact between each individual component and the case. The strip also retains mechanical strength for handling during the subsequent tightening of the components to the case surface with screws. Each segment of the strip acts as a freestanding nut to secure the components to the case for maximal heat transfer without putting lateral pressure on the components, which can occur with rigid metal strips.

Figure 15A:
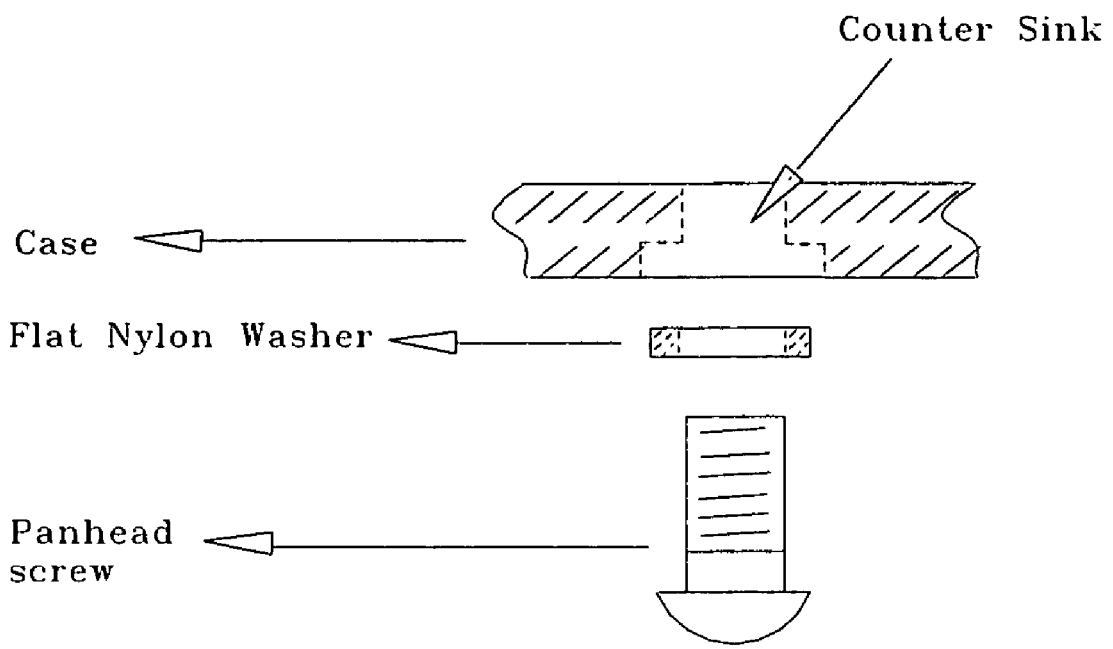
FIGS. 15A and 15B are diagrams illustrating a fastening mechanism for mounting power components of an inverter charger system according to another embodiment of the invention.
Figure 15B:
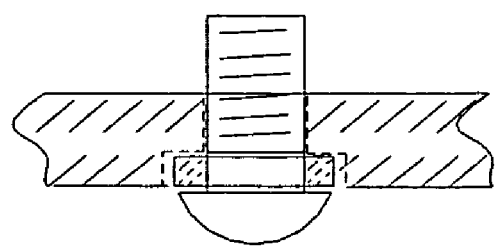

Nylon washers are used as gaskets to waterproof the openings for screws on the case exterior. Countersinks, as shown in block diagram FIG. 15A, are used to retain the shape of the pliable nylon washers as the screws are tightened (as shown in FIG. 15B); there is only enough space in these cavities for the washer, and they prevent any outward distortion of the nylon that may be caused when pressure is applied to tighten the screws. For the screws that require grounding, sealant is applied to the screw and opening to produce the watertight seal while still allowing contact of the metal screw to the case.

Thus, techniques for high performance inverter charger systems have been described herein. In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A power supply system, comprising:
an inverter to generate an AC (alternating current) output based on a DC (direct current) input;
a current sensing circuit coupled to the inverter to sense an amount of current drawn from the inverter; and
a microcontroller coupled to the inverter and the current sensing circuit to shutdown the AC output of the inverter according to a predetermined algorithm stored within the microcontroller, in response to a detection that the amount of current drops below a predetermined threshold, wherein the predetermined algorithm and the predetermined threshold are programmed as part of programmable instructions stored in a machine-readable storage medium within the microcontroller, and wherein the programmable instructions, when executed by the microcontroller, cause the microcontroller to shutdown the AC output of the inverter according to the predetermined algorithm, in response to the detection that the amount of current drops below the predetermined threshold.

2. The system of claim 1, wherein the current sensing circuit comprises:

a current sense resister to sense the amount of current drawn from the inverter, generating a current sense voltage representing the current being sensed;

a comparator to compare the current sense voltage with the predetermined threshold, generating a signal representing whether the amount of current drops below the predetermined threshold, wherein the microcontroller operates based on the signal.

3. The system of claim 2, wherein the current sensing circuit further comprises an amplifier coupled to the current sense resister and the comparator to amplify the current sense voltage, and wherein the comparator compares the amplified current sense voltage with the predetermined threshold.

4. The system of claim 2, wherein the comparator comprises a first input to receive the current sense voltage from the current sense resister and a second input to receive a reference voltage, wherein the reference voltage is controlled by the microcontroller, and wherein an output of the comparator is used to determine a current limit of the inverter.

5. The system of claim 4, wherein the microcontroller is configured to set a first current limit during a first period of time and to set a second current limit during a second period of time after the first period of time, wherein the first and second current limits are different and are programmed as part of programmable instructions stored in the storage medium of the microcontroller.

6. The system of claim 5, wherein the first current limit is higher than the second current limit.

7. The system of claim 1, wherein the microcontroller is programmable including programming the predetermined algorithm.

8. The system of claim 7, wherein the predetermined algorithm comprises a period of time that has to lapse after the amount of current drawn drops below the predetermined threshold and before turning off the inverter.

9. The system of claim 1, further comprising a pulse width modulator (PWM) coupled to the microcontroller to adjust a duty cycle of the inverter in response to an output of the microcontroller.

10. The system of claim 9, further comprising:
a battery coupled to provide the DC input to the inverter; and
a fuel gauge coupled to the battery and the microcontroller to monitor operating conditions of the battery, wherein the microcontroller is configured to control operating the inverter based on the operating conditions of the battery provided by the fuel gauge.

11. The system of claim 10, wherein the operating conditions of the battery comprise at least one of an output voltage of the battery, an amount of current drawn from the battery, and a remaining power available from the battery.

12. The system of claim 11, wherein the microcontroller is a first microcontroller and the predetermined algorithm is a first predetermined algorithm, and wherein the fuel gauge further comprises a second microcontroller to generate a control signal to the first microcontroller based on the operating conditions of the battery using a second predetermined algorithm.

13. A power supply system, comprising:
an inverter to generate an AC (alternating current) output based on a DC (direct current) input; and
a microcontroller coupled to the inverter to adjust the AC output of the inverter according to a predetermined algorithm stored within the microcontroller, when the AC output of the inverter satisfies a predetermined condition for a predetermined period of time, wherein at least one of the predetermined algorithm, the predetermined condition, and the predetermined period of time are user programmable within the microcontroller, wherein the microcontroller is programmed to turn off the inverter when an amount of current drawn from the inverter drops below a predetermined threshold for the predetermined period of time,
wherein the predetermined algorithm, the predetermined threshold, and the predetermined period of time are programmed as part of programmable instructions stored in a machine-readable storage medium within the microcontroller, and wherein the programmable instructions, when executed by the microcontroller, cause the microcontroller to turn off the inverter when the amount of current drawn from the inverter drops below the predetermined threshold for the predetermined period of time.

14. The system of claim 13, further comprising:
an AC input to receive a shore power; and
a charger configured to charge a battery coupled to the DC input when the shore power is detected by the microcontroller coupled to the AC input,
wherein the microcontroller is programmed to switch the power supply system from an inverter mode to a charging mode by turning off the inverter and controlling the charger to charge the battery using the shore power received from the AC input, and wherein the microcontroller is further programmed to allow the shore power to be provided at the AC output when the inverter is turned off.

* * * * *